(12) United States Patent
Christl

(10) Patent No.: US 11,965,447 B2
(45) Date of Patent: Apr. 23, 2024

(54) METHOD FOR CONTROLLING AN EXHAUST-GAS AFTERTREATMENT SYSTEM OF AN INTERNAL COMBUSTION ENGINE HAVING AT LEAST TWO SCR CATALYTIC CONVERTERS CONNECTED IN SERIES

(71) Applicant: Robert Bosch GmbH, Stuttgart (DE)

(72) Inventor: Werner Christl, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/345,414

(22) Filed: Jun. 30, 2023

(65) Prior Publication Data
US 2024/0003281 A1 Jan. 4, 2024

(30) Foreign Application Priority Data
Jul. 4, 2022 (DE) ...................... 10 2022 206 802.5

(51) Int. Cl.
*F01N 3/20* (2006.01)
*B01D 53/94* (2006.01)
(Continued)

(52) U.S. Cl.
CPC ......... *F01N 3/208* (2013.01); *B01D 53/9431* (2013.01); *B01D 53/9477* (2013.01);
(Continued)

(58) Field of Classification Search
CPC ...... F01N 3/208; F01N 3/2066; F01N 3/2892; F01N 3/035; F01N 3/0814;
(Continued)

(56) References Cited

U.S. PATENT DOCUMENTS

| 7,251,929 B2 * | 8/2007 | Hu | ................. F01N 11/002 60/288 |
| 8,635,862 B2 * | 1/2014 | Gonze | ............ F01N 11/002 60/284 |

(Continued)

FOREIGN PATENT DOCUMENTS

DE 102009035692 A1 2/2011

*Primary Examiner* — Mark A Laurenzi
*Assistant Examiner* — Dapinder Singh
(74) *Attorney, Agent, or Firm* — NORTON ROSE FULBRIGHT US LLP; Gerard A. Messina

(57) ABSTRACT

A method for controlling an exhaust-gas aftertreatment system of an internal combustion engine having at least two SCR catalytic converters connected in series. The exhaust-gas aftertreatment system has a bypass including a bypass valve around the first SCR catalytic converter, and exhaust gases of the internal combustion engine are routed around the first SCR catalytic converter via the bypass. The method includes: ascertaining an activation of an exhaust brake operation; ascertaining a first actual temperature for the first SCR catalytic converter; ascertaining an actual NH3 storage level for the first SCR catalytic converter; ascertaining a modeled, maximally permitted NH3 storage level as a function of the actual NH3 storage level; ascertaining a future temperature for the first SCR catalytic converter; ascertaining a comparison as a function of the ascertained first actual and future temperatures; actuating the bypass valve as a function of the ascertained comparison, opening the bypass valve.

6 Claims, 3 Drawing Sheets

(51) Int. Cl.
*F01N 3/28* (2006.01)
*F01N 13/00* (2010.01)

(52) U.S. Cl.
CPC ....... *B01D 53/9495* (2013.01); *F01N 3/2892* (2013.01); *F01N 13/0093* (2014.06); *F01N 2900/08* (2013.01); *F01N 2900/1602* (2013.01)

(58) Field of Classification Search
CPC .... F01N 13/0093; F01N 13/009; F01N 13/08; F01N 9/00; F01N 9/002; F01N 11/00; F01N 2900/08; F01N 2900/1602; F01N 2900/1404; F01N 2900/1811; F01N 2610/02; F01N 2610/14; F01N 2560/06; F01N 2240/20; B01D 53/9431; B01D 53/9477; B01D 53/9495; Y02T 10/12; Y02T 10/40; Y02A 50/20
See application file for complete search history.

(56) References Cited

U.S. PATENT DOCUMENTS

| | | | | |
|---|---|---|---|---|
| 8,720,189 | B2* | 5/2014 | Ren | F01N 13/009 60/277 |
| 11,149,608 | B2* | 10/2021 | Barbier | F01N 9/00 |
| 11,725,564 | B2* | 8/2023 | Gupta | F01N 11/00 60/285 |
| 2015/0226100 | A1* | 8/2015 | Bandl-Konrad | F01N 3/208 423/213.7 |
| 2018/0266344 | A1* | 9/2018 | Moriyasu | F02D 41/10 |

\* cited by examiner

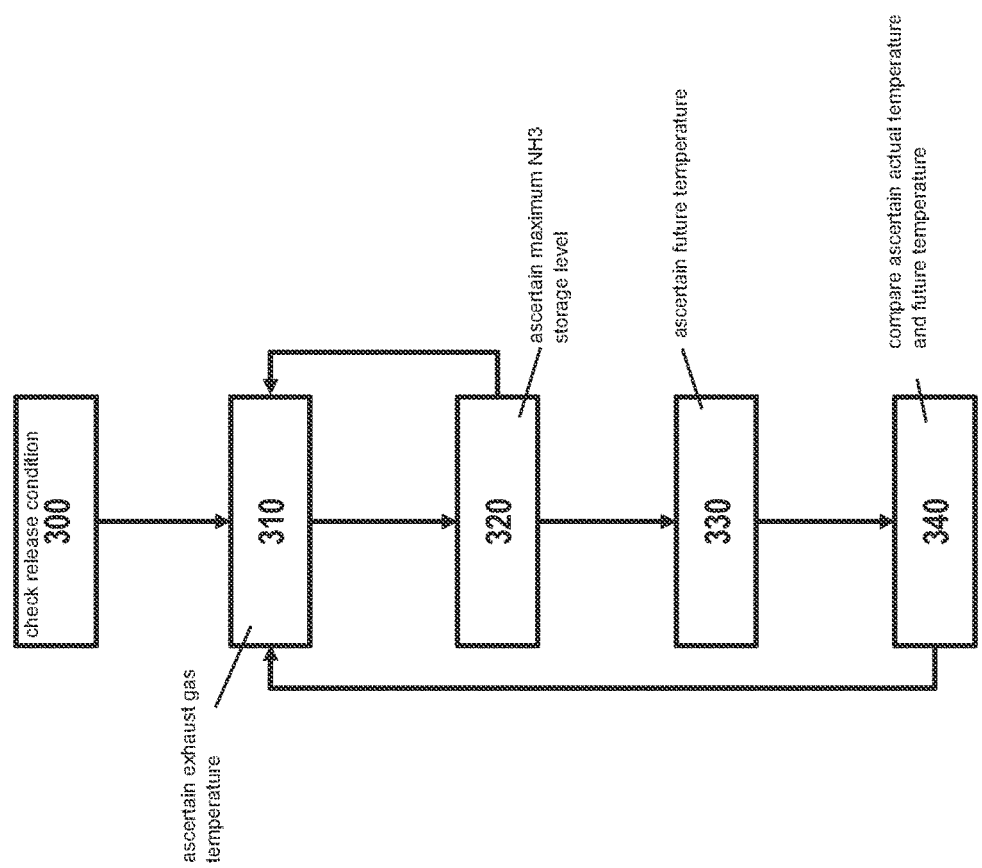

METHOD FOR CONTROLLING AN EXHAUST-GAS AFTERTREATMENT SYSTEM OF AN INTERNAL COMBUSTION ENGINE HAVING AT LEAST TWO SCR CATALYTIC CONVERTERS CONNECTED IN SERIES

BACKGROUND INFORMATION

Especially in commercial vehicles such as trucks, exhaust brakes are a standard technology in addition to conventional service brakes. In this context, what is known as compression release brakes, also called exhaust-flap brakes or exhaust flaps, are conventional types. Existing engine brakes are known under the name "Jake brake" or "Jacobs brake".

Because of the ever more stringent emission regulations, such as the EUR07 laws, new concepts must be implemented for the exhaust-gas aftertreatment systems so that dinitrogen monoxide (N2O) or ammonia slip (NH3), for example, can be avoided.

German Patent Application No. DE 10 2009 035 692 A1 describes a method for purifying an exhaust-gas flow of an exhaust-charged internal combustion engine in which nitrogen oxides are removed from the exhaust flow with the aid of a selective catalytic reduction; here, the exhaust flow upstream from an exhaust turbine of an exhaust turbocharger and upstream from at least one SCR catalytic converter is split up into a main exhaust flow, which is guided in a main exhaust line to the exhaust turbocharger, and into at least one bypass exhaust flow, which is routed in a bypass line past the exhaust turbine, and a defined quantity of a reducing agent precursor substance to be broken down is supplied to the bypass exhaust flow in defined operating states of the internal combustion engine, the reducing agent precursor substance being converted into a reducing agent, preferably ammonia, in a reactor which is fluidically connected to the bypass exhaust flow, and the reducing agent is discharged from the reactor with the aid of the bypass exhaust flow and supplied upstream from the SCR catalytic converter to the main exhaust flow; and at least one blocking and/or throttling device is provided, which is coupled with the aid of a control and/or regulation device and can be actuated as a function of defined operating parameters, and at least one branching line branches off from the main exhaust line downstream from the exhaust turbine, which terminates upstream from the reactor and/or upstream from an inmixing point for a reducing agent precursor substance into the bypass line, and by which a branching exhaust flow branches off as a function of defined operating states of internal combustion engines, in particular outside of a defined idling and/or low-load operation of the internal combustion engine, and is conveyed to the bypass line.

SUMMARY

In a first aspect, the present invention relates to a method for controlling an exhaust-gas aftertreatment system of an internal combustion engine having at least two SCR catalytic converters connected in series, the exhaust-gas aftertreatment system having a bypass with a bypass valve around the first SCR catalytic converter, and exhaust gases from the internal combustion engine are routed completely or at least partially around the first SCR catalytic converter via the bypass. According to an example embodiment of the present invention, the method includes the following steps:

Ascertaining an activation of an exhaust brake operation for the internal combustion engine, ascertaining a first actual temperature for the first SCR catalytic converter, ascertaining an actual NH3 storage level for the first SCR catalytic converter, ascertaining a modeled, maximally permitted NH3 storage level as a function of the actual NH3 storage level, ascertaining a future temperature for the first SCR catalytic converter with the aid of a predictive temperature model, ascertaining a comparison as a function of the ascertained first actual temperature and the ascertained future temperature, actuating the bypass valve as a function of the ascertained comparison, in particular completely or partially opening the bypass valve.

During an activated exhaust brake operation for the internal combustion engine, the internal combustion engine generates no or very few nitrogen oxide emissions (NOx emissions), and a considerable increase in the exhaust-gas temperature comes about in addition. As a result of the low quantity of produced nitrogen oxide emissions in this operating state, the first SCR catalytic converter, which has stored ammonia (NH3) for the selective catalytic reaction, has a very low or no conversion rate. However, with the then additionally rising exhaust-gas temperature, there is a drop in the ammonia storage capacity of the first SCR catalytic converter with the result that undesired ammonia slip or the desorption of ammonia (NH3) from the first SCR catalytic converter may occur. Moreover, the formation of dinitrogen monoxide (N2O) is promoted.

In this regard, the method may offer an special advantage that when an exhaust brake operating state is detected, a rerouting of the combustion exhaust gas via the bypass is able to be implemented as a function of the temperature of the first SCR catalytic converter and its NH3 storage level when an ammonia slip is ascertained at a future time. Through this selective control of the bypass, the desorption of ammonia (NH3) is largely prevented, and the formation of harmful dinitrogen monoxide (N2O) is additionally avoided or minimized via the first SCR stage. As a result, an emission strategy for satisfying the desired exhaust emissions is able to be implemented, in which the capability and efficiency of the second SCR stage is furthermore taken into account for the control of the bypass. A flow through the second SCR stage still takes place so that a filtration of the exhaust gas is therefore still provided.

In one special embodiment of the present invention, a future NH3 storage level is ascertained for the first SCR catalytic converter as a function of the ascertained future temperature.

In addition, according to an example embodiment of the present invention, a comparison between an amount of a first difference and a first threshold value may be ascertained, the amount of the first difference being formed between the future NH3 storage level and the ascertained actual NH3 storage level, and if the amount of the first difference exceeds the first threshold value, then the bypass valve will be opened or at least partially opened.

The present method may thus offer an advantage that a rapid response to changing NH3 storage levels may be possible so that an ammonia slip and also a disadvantageous formation of dinitrogen monoxide emissions can be reduced or even avoided.

In one preferred embodiment of the present invention, a comparison between an amount of a second difference and a second threshold value is ascertained, the amount of the second difference being formed between the ascertained future temperature and the ascertained first actual temperature, and if the amount of the second difference exceeds the second threshold value, the bypass valve will be opened or at least partially opened.

Under the assumption that the NH3 storage level of the first SCR catalytic converter 4 virtually no longer changes starting with an activated exhaust brake operation, it is advantageous to carry out the regulation of the control of the bypass as a function of the ascertained future temperature and the ascertained first actual temperature. This makes it possible to save resources in calculating the method for the control device.

In further aspects, the present invention relates to a device, in particular a control device and a computer program, which are developed, in particular programmed, to execute one of the methods of the present invention. In a still further aspect, the present invention relates to a machine-readable memory medium on which the computer program is stored.

BRIEF DESCRIPTION OF THE DRAWINGS

In the following text, the present invention will be described in greater detail with the aid of an exemplary embodiment shown in the figures.

FIG. 3 shows a flow diagram for the graphical representation of the sequence of a second exemplary embodiment of the method of the present invention.

DETAILED DESCRIPTION OF EXAMPLE EMBODIMENTS

Figure 1:
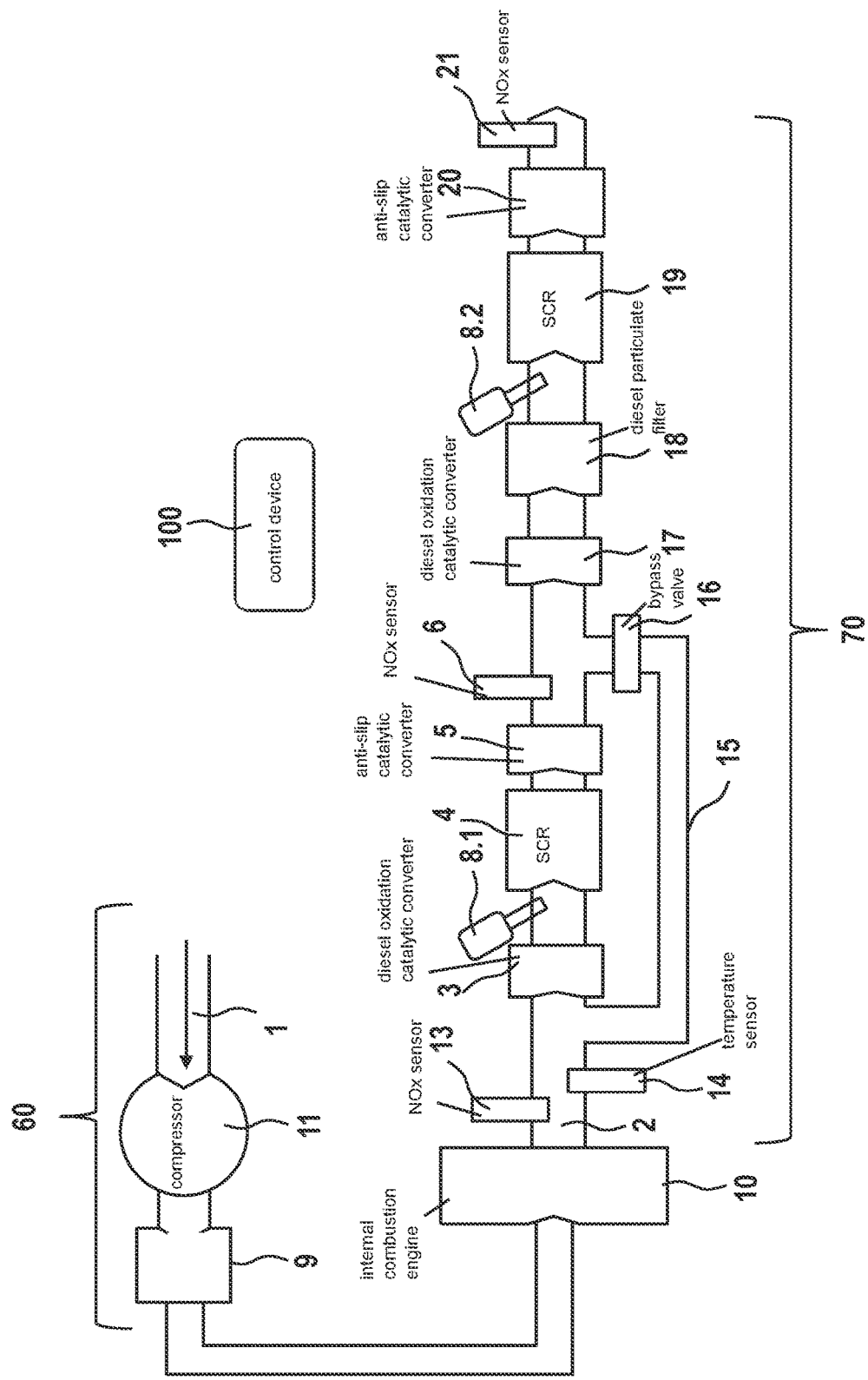
FIG. 1 shows a schematic representation of an internal combustion engine 10 for a commercial vehicle having a decompression exhaust brake.

From FIG. 1, an internal combustion engine 10 can be gathered, which is connected to a fresh-air path 1 on the intake side and to an exhaust path 2 on the discharge side. Internal combustion engine 10 is preferably a power unit for commercial motor vehicles having an exhaust brake.

In addition, internal combustion engine 10 may include an actuating device, which is not shown further, for metering fuel into each cylinder, and also an adjustment device for the valve-lift curves such as a camshaft adjustment device (not shown further) for internal combustion engine 10. Air supply 60 of fresh-air path 1 is connected to the cylinders of internal combustion engine 10 via intake valves (not shown) in a convention manner. Combustion exhaust gas is expelled into exhaust system 70 in a generally conventional manner via corresponding discharge valves (not shown) of the cylinders.

Moreover, a turbocharger (not shown) may be disposed in exhaust path 2 and a compressor 11 in fresh-air path 1. Via exhaust path 2, the exhaust gas produced during the combustion process in internal combustion engine 10 is discharged. The exhaust gas is subjected to an exhaust-gas aftertreatment. For this purpose, a first NOx sensor 13, a first temperature sensor 14, an optional diesel oxidation catalytic converter 3, a first urea-injection valve 8.1, a first selective catalytic converter 4 (SCR), an optional first anti-slip catalytic converter 5, and a second NOx sensor 6 are situated downstream in exhaust path 2. This group of components forms a first stage (SCR stage) of the exhaust-gas purification. Situated downstream from the first stage of the exhaust-gas purification is a second diesel oxidation catalytic converter 17, a diesel particulate filter 18, a second urea-injection valve 8.2, a second SCR catalytic converter 19, an optional second anti-slip catalytic converter 20, and a second NOx sensor 21. This group of components forms a second stage (SCR stage) for the exhaust-gas purification.

Disposed downstream from first internal combustion engine 10 and upstream from first diesel oxidation catalytic converter 3 is a bypass 15 around the first stage of the exhaust-gas purification, which terminates downstream from first selective catalytic converter 4 or optional first anti-slip catalytic converter 5 and upstream from second diesel oxidation catalytic converter 17 into exhaust train 2.

In addition, bypass 15 has an electronic actuating device 16, preferably a bypass valve 16, for opening and closing bypass 15. The electronic actuating device is preferably developed as a stepper motor and actuated with the aid of control device 100. Bypass 15 has the task of routing hot exhaust gas arriving from internal combustion engine 10 past the first stage. In the process, a lower temperature introduction for the exhaust-gas components is obtained as well as a lower introduction of emissions for the exhaust-gas components. Since the storage capacity for ammonia is reduced in SCR catalytic converters 4, 19 with a rising temperature, it is advantageous if the first stage of the exhaust-gas purification is able to be circumvented with the aid of bypass 15 in operating situations for internal combustion engine 10 during which a lot of exhaust heat but only low emissions are generated. Otherwise, an increased ammonia slip, for instance, may be triggered in first SCR catalytic converter 4.

The first stage of the exhaust-gas purification is essentially responsible for a rapid NOx reduction after a cold-engine start (cold operation) and is preferably situated in close proximity to internal combustion engine 10.

First SCR catalytic converter 4 may also be developed as a combined SCR catalytic converter equipped with a diesel particulate filter.

Anti-slip catalytic converters 5 and 20 are preferably developed in such a way that they remove possible ammonia residues in the exhaust gases so that no ammonia slip is produced. However, they have only a limited storage capacity.

The aforementioned temperature sensors and NOx sensors 6, 13, 14, 21 are connected to a control device 100 in a convention manner, and their signals are received and stored by control device 100.

In addition, the illustrated system includes a conventional urea-injection system, which is made up of an SCR tank having a pump unit, which conveys urea liquid at a predefinable pressure to first and second urea injection valves 8.1, 8.2 in a conventional manner. The urea injection system is controlled using a control strategy stored in control device 100.

Moreover, measured variables such as the exhaust-mass flow and the engine speed of internal combustion engine 10 are able to be called up from control device 100 in a generally conventional manner.

An NH3 storage-level model is stored in control device 100 for ascertaining an NH3 storage level for both SCR catalytic converters 4, 19. Modeled first NH3 storage level $NH3_{mod,Cat_1}$ for first SCR catalytic converter 4 is ascertained with the aid of a first NH3 storage-level model, preferably as a function of the urea quantity metered through first metering valve 8.1 and/or the first NOx concentration $c_{NoxUp,SCR_1}$ upstream from first SCR catalytic converter 4 with the aid of first NOx sensor 13, and/or first temperature $T_{Actual,Cat_1}$ of first SCR catalytic converter 4 and/or exhaust-gas mass flow $\dot{m}_{exh}$.

First temperature $T_{Actual,Cat_1}$ of first SCR catalytic converter 4 is preferably able to be ascertained using a temperature model as a function of first temperature sensor 14 by control device 100. First NOx concentration $c_{Nox,UP,SCR_1}$ is preferably ascertained with the aid of first NOx sensor 13.

Modeled second NH3 storage level $NH3_{mod,Cat_2}$ for second SCR catalytic converter 19 is ascertained with the aid of a second NH3 storage-level model, preferably as a function of the urea quantity metered by first metering valve 8.1 and/or the second NOx concentration $c_{NOxUp,SCR_2}$ upstream from second SCR catalytic converter 19 and/or the second NH3 concentration upstream from second SCR catalytic converter 19 and/or the urea quantity metered by second metering valve 8.2, and/or second catalytic converter temperature $T_{Actual,Cat_2}$ of second SCR catalytic converter 19 and/or exhaust-gas mass flow $\dot{m}_{exh}$.

Second temperature $T_{Actual,Cat_2}$ of second SCR catalytic converter 19 may be ascertained by control device 100, preferably with the aid of a temperature model as a function of a second temperature sensor, which is not shown further. The second temperature sensor is preferably situated downstream from diesel particulate filter 18 and upstream from second SCR catalytic converter 19. The second NOx concentration $c_{NOxUp,SCR_2}$ is preferably ascertained using second NOx sensor 6.

Figure 2:
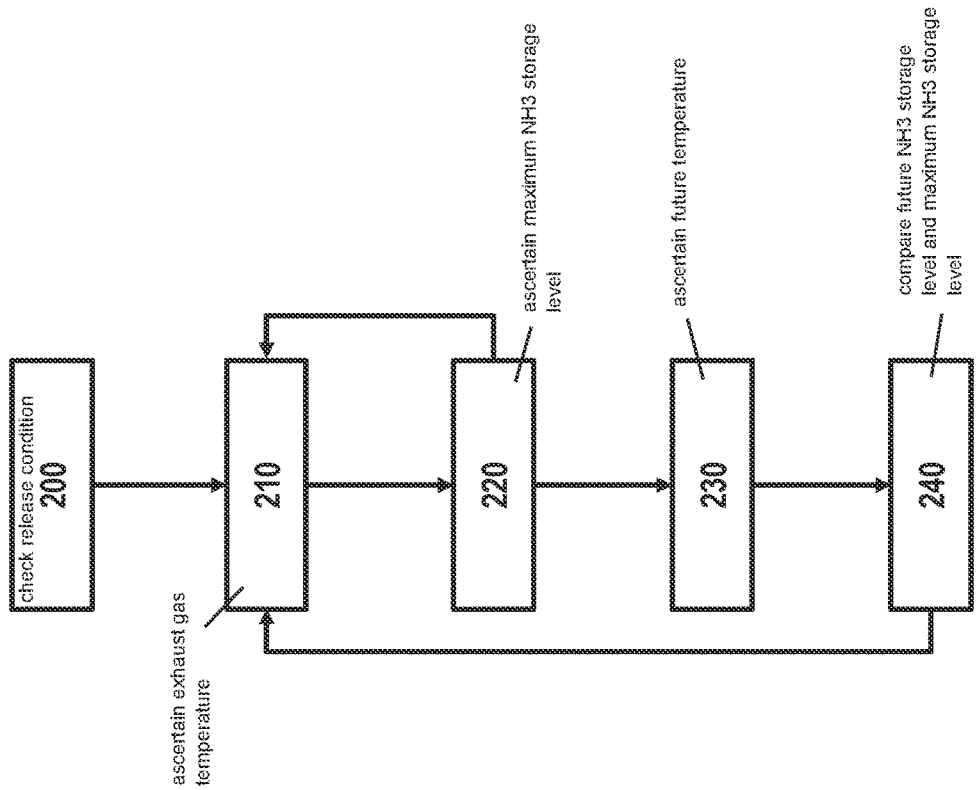
FIG. 2 shows a flow diagram for a graphical representation of the sequence of a first exemplary embodiment of the method of the present invention.

FIG. 2, by way of example, shows the sequence of the method for controlling an exhaust-gas aftertreatment of a combustion engine having a plurality of SCR catalytic converters 4, 19 which are connected in series. Described as examples are the essential steps of the method according to the present invention.

In first step 200, a release condition for the present method is checked, and a release for the method is granted if an operating state exists for internal combustion engine 10 in which the exhaust brake is active. In one advantageous embodiment, a brake coordinator is stored in control device 100, which detects the activation of an exhaust brake and advantageously outputs this activation via a status bit.

The operating state of an activated exhaust brake is preferably detected via an essential or considerable change in the engine speed and/or an air-mass flow and/or an operation of the brake pedal, and/or an engine torque, and/or in the gas pedal position within a predefined time interval. For this purpose, control device 100 continually monitors the input variables, and if an operating state is detected in which the exhaust brake of combustion engine 10 is activated, the method will be continued in step 210.

In a step 210, exhaust-gas temperature $T_{exh}$ is then ascertained with the aid of first temperature sensor 14, and first NOx concentration $c_{NOxUp,SCR_1}$ and actual NH3 storage level $NH3_{Actual,Cat_1}$ of first SCR catalytic converter 4 are ascertained by control device 100 with the aid of the NH3 storage-level model. The method is then continued in a step 220.

In a step 220, using a model stored in control device 100, maximum NH3 storage level $NH3_{Limit}$ modeled at first actual temperature $T_{Actual,Kat_1}$ is ascertained as a function of first actual temperature $T_{Actual,Kat_1}$ for first SCR catalytic converter 4.

In one advantageous embodiment, modeled maximum NH3 storage level $NH3_{Limit}$ as a function of the temperature for SCR catalytic converter 4 is stored in a program map in control device 100. The NH3 storage levels are advantageously ascertained as a function of the temperature of first SCR catalytic converter 4 during an application phase and then stored in control device 100 in a program map.

If actual NH3 storage level $NH3_{mod,Cat_1}$ of first SCR catalytic converter 4 ascertained in step 210 exceeds maximum NH3 storage level $NH3_{Limit}$ for first actual temperature $T_{Actual,Cat_1}$ then bypass will be opened as an emergency measure, preferably completely opened, with the aid of bypass valve 16, and the method is continued or terminated in step 210. If the ascertained NH3 storage level drops below maximum NH3 storage level $NH3_{Limit}$, the method will be continued in step 230.

In a step 230, a predictive temperature model stored in control device 100 is used to ascertain a future temperature $T_{pre}$ for first SCR catalytic converter 4. Future temperature $T_{pre}$ preferably corresponds to a temperature at a next time step, preferably in milliseconds, seconds, or minutes. The future temperature is advantageously ascertained in the time raster or time period of 1.5, 10 or 100 milliseconds, or seconds. In an advantageous manner, the current engine speed $n_{eng}$ of internal combustion engine 10, the current exhaust-gas mass flow $m_{exh}$, the current gas pedal position, the requested brake torque, the currently engaged gear of internal combustion engine 10, and the efficiency of the exhaust brake are used as input variables for the predictive temperature model. A future NH3 storage level $NH3_{pre}$ is ascertained for first SCR catalytic converter 4 as a function of ascertained future temperature $T_{pre}$. Next, the method is continued in a step 240.

In a step 240, a comparison between future NH3 storage level $NH3_{pre}$ and maximum NH3 storage level $NH3_{Limit}$ ascertained in step 220 is then performed. In an advantageous manner, an amount of first difference $D_1$ between future NH3 storage level $NH3_{pre}$ and ascertained maximum NH3 storage level $NH3_{Limit}$ is able to be ascertained by control device 100. If this amount of first difference $D_1$ exceeds a predefinable first threshold value $S_1$, bypass 15 will be opened or partially opened with the aid of bypass valve 16. In one advantageous embodiment, the opening of bypass 15 may be carried out as a function of a magnitude of the exceedance of first threshold value $S_1$ by the amount of first difference $D_1$. If the amount of first difference $D_1$ lies below first threshold value $S_1$, the method is continued in step 210 or terminated.

In one advantageous embodiment, the opening of bypass valve 16 is controlled on a continuous basis when the present method is repeated anew in a loop starting with step 210.

FIG. 3 shows a second exemplary sequence of the method for controlling an exhaust-gas aftertreatment of a combustion engine having a plurality of SCR catalytic converters 4, 19 connected in series. The essential steps of the method of the present invention are described by way of example.

In a first step 300, a release condition for the method is checked, and a release for the method is granted if an operating state exists for internal combustion engine 10 in which the exhaust brake is active. In one advantageous embodiment, a brake coordinator is stored in control device 100, which detects the activation of an exhaust brake and advantageously outputs this activation via a status bit. The operating state of an activated exhaust brake is preferably detected via a change in an engine speed and/or an air-mass flow and/or an operation of the brake pedal, and/or a change in an engine torque and/or a gas-pedal position, the change being of a considerable or great magnitude and occurring in a predefined time interval. To this end, control device 100 continually monitors the input variables, and when an operating state is detected in which the exhaust brake of combustion engine 10 is activated, the method is continued in step 310.

In a step 310, exhaust-gas temperature $T_{exh}$ is then ascertained with the aid of first temperature sensor 14, and first NOx concentration $c_{NOxUp,SCR_1}$ and actual NH3 storage level $NH3_{Actual,Cat_1}$ of first SCR catalytic converter 4 is ascertained by control device 100 with the aid of the NH3 storage-level model. The method is then continued in a step 320.

In a step 320, a model stored in control device 100 is used to ascertain maximum NH3 storage level $NH3_{Limit}$ modeled at first actual temperature $T_{Actual,Cat_1}$ for first SCR catalytic converter 4 as a function of first actual temperature $T_{Actual,Cat_1}$, and a maximally allowed temperature $T_{Limit}$ is determined therefrom for first SCR catalytic converter 4. Above this maximally permitted temperature $T_{Limit}$ for first SCR catalytic converter 4, a desorption of ammonia and thus an undesired ammonia slip occurs as a result of the NH3 storage capacity of first SCR catalytic converter 4, which decreases with the rising temperature.

In one advantageous embodiment, the modeled maximum NH3 storage level $NH3_{Limit}$ as a function of the temperature for first SCR catalytic converter 4 is stored in a program map in control device 100. In an advantageous manner, the NH3 storage levels are ascertained as a function of the temperature of first SCR catalytic converter 4 during an application phase and then stored in control device 100 in a program map. From this program map, it is then correspondingly possible to also ascertain the maximally permitted temperatures $T_{Limit}$ for first SCR catalytic converter 4.

In addition, it will now be assumed that the ascertained actual NH3 storage level $NH3_{Actual,Cat_1}$ will no longer change or remain virtually constant. This assumption is made because internal combustion engine 10 generates only few NOx emissions during an exhaust brake operation so that only a slight or no conversion of NOx emissions takes place in first SCR catalytic converter 4 with the ammonia (NH3) stored there. Ascertained load state $NH3_{Actual,Cat_1}$ of first SCR catalytic converter 4 thus remains unchanged or changes only to a negligible extent.

If first actual temperature $T_{Actual,Cat_1}$ ascertained in step 310 exceeds maximally allowed temperature $T_{Limit}$, bypass 15 will be opened, preferably fully opened, as an emergency measure with the aid of bypass valve 16, and the method is continued in step 310 or terminated. If ascertained first actual temperature $T_{Actual,Cat_1}$ drops below maximally permitted temperature $T_{Limit}$, the method is continued in step 330.

In a step 330, a predictive temperature model stored in control device 100 is used to ascertain a future temperature $T_{pre}$ for first SCR catalytic converter 4. The future temperature $T_{pre}$ preferably corresponds to a temperature at a next time step, preferably in milliseconds, seconds or minutes. In an advantageous manner, future temperature $T_{pre}$ is ascertained in a time raster or time period of 1.5, 10 or 100 milliseconds, or in seconds.

In an advantageous manner, the current engine speed $n_{eng}$ of internal combustion engine 10, the current exhaust-gas mass flow $m_{exh}$, the current gas pedal position, the requested brake torque, the currently engaged gear of internal combustion engine 10, and the efficiency of the exhaust brake are used as input variables for the predictive temperature model.

Since, as mentioned above, the NH3 storage level of first SCR catalytic converter 4 remains virtually unchanged in the operating state of internal combustion engine 10 featuring an activated exhaust brake, ascertained future temperature $T_{pre}$ corresponds to the new, maximally allowed temperature $T_{Limit,pre}$. The method is then continued in a step 340.

In a step 340, a comparison is performed between ascertained first actual temperature $T_{Actual,Cat_1}$ and future temperature $T_{pre}$ ascertained in step 330. In an advantageous manner, an amount of the second difference $D_2$ between future temperature $T_{pre}$ ascertained in step 330 and ascertained first actual temperature $T_{Actual,Cat_1}$ is able to be ascertained by control device 100. If this amount of second difference $D_2$ exceeds a predefinable second threshold value $S_2$, bypass 15 will be opened or partially opened with the aid of bypass valve 16. In one advantageous embodiment, the opening of bypass 15 may be carried out as a function of a magnitude of the exceedance of second threshold value $S_2$ by the amount of second difference $D_2$. If the amount of second difference $D_2$ undershoots second threshold value $S_2$, the method is continued in step 310 or terminated.

In one advantageous embodiment, the opening of bypass valve 16 is continuously controlled when the method is run through anew in a loop starting with step 310.

What is claimed is:

1. A method for controlling an exhaust-gas aftertreatment system of an internal combustion engine having at least two SCR catalytic converters connected in series, the exhaust-gas aftertreatment system having a bypass including a bypass valve around a first SCR catalytic converter of the at least two SCR catalytic converters, exhaust gases from the internal combustion engine being completely or at least partially routed around the first SCR catalytic converter via the bypass, the method comprising the following steps:
   ascertaining an activation of an exhaust brake operation for the internal combustion engine;
   ascertaining a first actual temperature for the first SCR catalytic converter;
   ascertaining an actual NH3 storage level for the first SCR catalytic converter;
   ascertaining a modeled, maximally permitted NH3 storage level as a function of the actual NH3 storage level;
   ascertaining a future temperature for the first SCR catalytic converter using a predictive temperature model;
   ascertaining a comparison as a function of the ascertained first actual temperature and the ascertained future temperature; and
   actuating the bypass valve as a function of the ascertained comparison to completely or partially open the bypass valve.

2. The method as recited in claim 1, wherein a future NH3 storage level is ascertained for the first SCR catalytic converter as a function of the ascertained future temperature.

3. The method as recited in claim 2, wherein a comparison between an amount of a first difference and a first threshold value is ascertained, the amount of the first difference being a difference between the future NH3 storage level and the ascertained actual NH3 storage level, and based on the amount of the first difference exceeding the first threshold value, the bypass valve is opened or at least partially opened.

4. The method as recited in claim 1, wherein the comparison between an amount of the second difference and a second threshold value is ascertained, the amount of the second difference being a difference between the ascertained future temperature and the ascertained first actual temperature, and based on the amount of the second difference exceeding the second threshold value, the bypass valve is opened or at least partially opened.

5. A non-transitory electronic memory medium on which is stored a computer program for controlling an exhaust-gas aftertreatment system of an internal combustion engine having at least two SCR catalytic converters connected in series, the exhaust-gas aftertreatment system having a bypass including a bypass valve around a first SCR catalytic converter of the at least two SCR catalytic converters, exhaust gases from the internal combustion engine being completely or at least partially routed around the first SCR catalytic converter via the bypass, the computer program, when executed by a computer, causing the computer to perform the following steps:
 ascertaining an activation of an exhaust brake operation for the internal combustion engine;
 ascertaining a first actual temperature for the first SCR catalytic converter;
 ascertaining an actual NH3 storage level for the first SCR catalytic converter;
 ascertaining a modeled, maximally permitted NH3 storage level as a function of the actual NH3 storage level;
 ascertaining a future temperature for the first SCR catalytic converter using a predictive temperature model;
 ascertaining a comparison as a function of the ascertained first actual temperature and the ascertained future temperature; and
 actuating the bypass valve as a function of the ascertained comparison to completely or partially open the bypass valve.

6. A device, comprising:
 a control device configured to control an exhaust-gas aftertreatment system of an internal combustion engine having at least two SCR catalytic converters connected in series, the exhaust-gas aftertreatment system having a bypass including a bypass valve around a first SCR catalytic converter of the at least two SCR catalytic converters, exhaust gases from the internal combustion engine being completely or at least partially routed around the first SCR catalytic converter via the bypass, the control device configured to:
 ascertain an activation of an exhaust brake operation for the internal combustion engine;
 ascertain a first actual temperature for the first SCR catalytic converter;
 ascertain an actual NH3 storage level for the first SCR catalytic converter;
 ascertain a modeled, maximally permitted NH3 storage level as a function of the actual NH3 storage level;
 ascertain a future temperature for the first SCR catalytic converter using a predictive temperature model;
 ascertain a comparison as a function of the ascertained first actual temperature and the ascertained future temperature; and
 actuate the bypass valve as a function of the ascertained comparison to completely or partially open the bypass valve.

* * * * *